United States Patent [19]

Ma

[11] 3,912,433
[45] Oct. 14, 1975

[54] AUTOMATIC EGG ROLL MAKING MACHINE

[76] Inventor: Kwok Chuen Ma, 144 Hester St., New York, N.Y. 10013

[22] Filed: Oct. 26, 1973

[21] Appl. No.: 410,253

[52] U.S. Cl............. 425/126 R; 425/127; 99/450.6; 426/283
[51] Int. Cl.². .......................................... A23G 3/00
[58] Field of Search........ 425/127, 126 R; 99/450.1, 99/450.6, 450.7

[56] References Cited
UNITED STATES PATENTS

| | | | |
|---|---|---|---|
| 3,633,517 | 1/1972 | Kao..................................... | 99/450.6 |
| 3,669,007 | 6/1972 | Pulici................................. | 99/450.6 |
| 3,724,361 | 4/1973 | Schafer............................... | 99/450.6 |

*Primary Examiner*—Francis S. Husar
*Assistant Examiner*—David S. Safran
*Attorney, Agent, or Firm*—Philip Young, Esq.

[57] ABSTRACT

Method and apparatus for automatically making egg rolls which includes a skin feeding device for feeding the egg roll dough skins in individually cut sections on to a conveyor. The conveyor includes a plurality of connected plates, each of which provides a semi-cylindrical mold cup that is used to form the egg roll skin in the desired shape around the food stuffing contained therein. Each section of egg roll skin moves on a conveyor plate to a position beneath a rotary turntable. The rotary turntable receives the food stuffing material from a food injector which deposits portions of food stuffing on to the egg roll skin as it passes beneath the rotary turntable. Each conveyor plate includes a mold cavity formed by the mold cup. As the food stuffing is transferred from the rotary turntable on to the egg roll skin, the food stuffing is passed by a compactor against the egg roll skin at the location of the mold cavity so as to compress the food stuffing in a compact form in the mold cavity. After the food is pressed into the mold cavity, two side folding plates on the conveyor plate are activated to fold the two opposite corners of the egg roll skin over towards the center of the skin. Once the side folding plates have been retracted away from the egg roll, the mold cup is activated from its position below the conveyor plate so that it pivots on to the top of the conveyor plate. The mold cup is retracted below the conveyor plate, leaving the egg roll in a partially formed condition whereby the food stuffing and its surrounding egg roll skin are folded over on top of the conveyor plate. The conveyor moves the semi-formed egg roll to a spraying station where a spray device directs a bonding agent, such as egg yolk or glucose, on to an exposed portion of the egg roll skin. The final rolling operation of the egg roll is performed by a rolling device which contacts and rolls the egg roll until the skin forms a cylindrical shape around the food stuffing.

19 Claims, 24 Drawing Figures

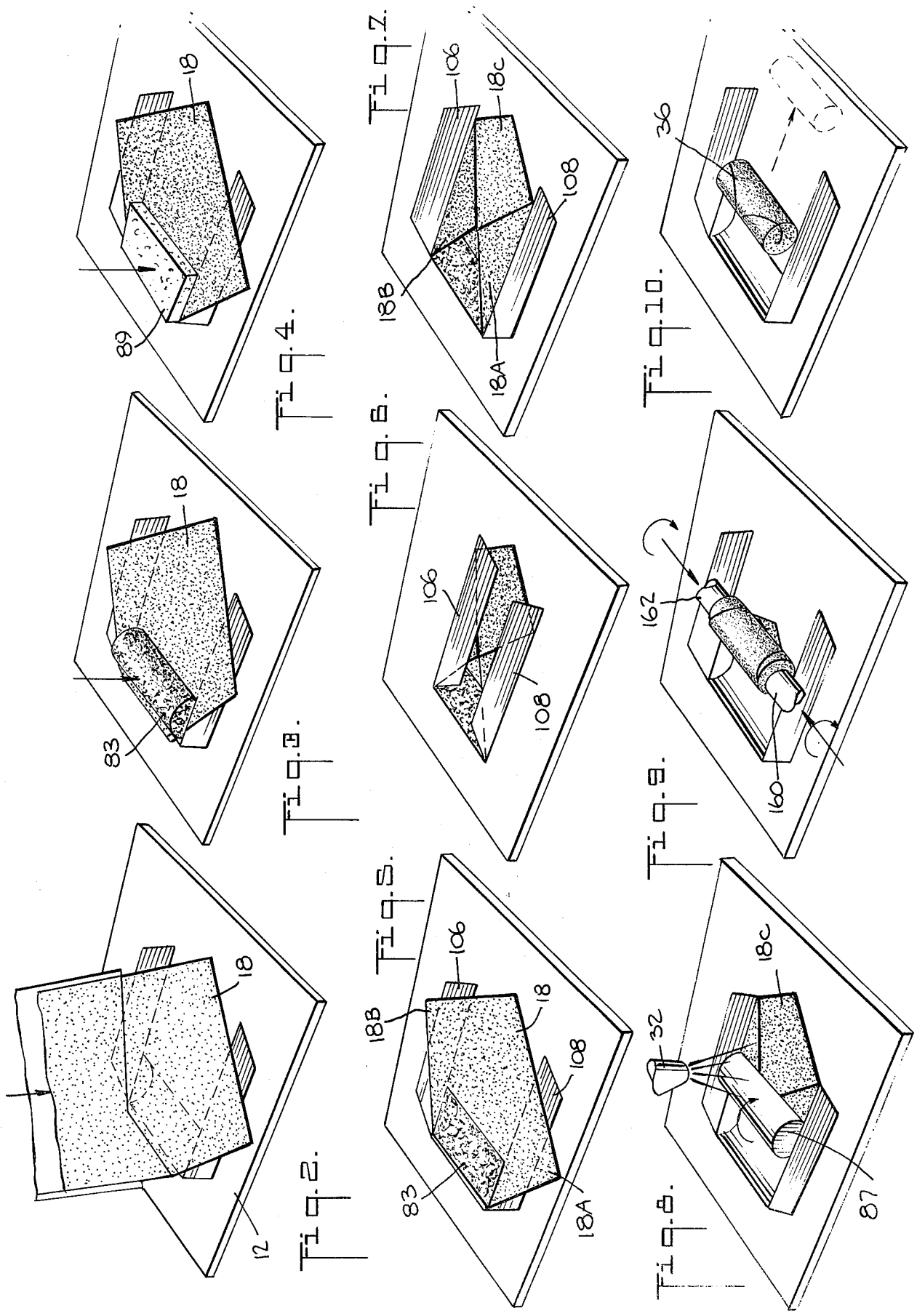

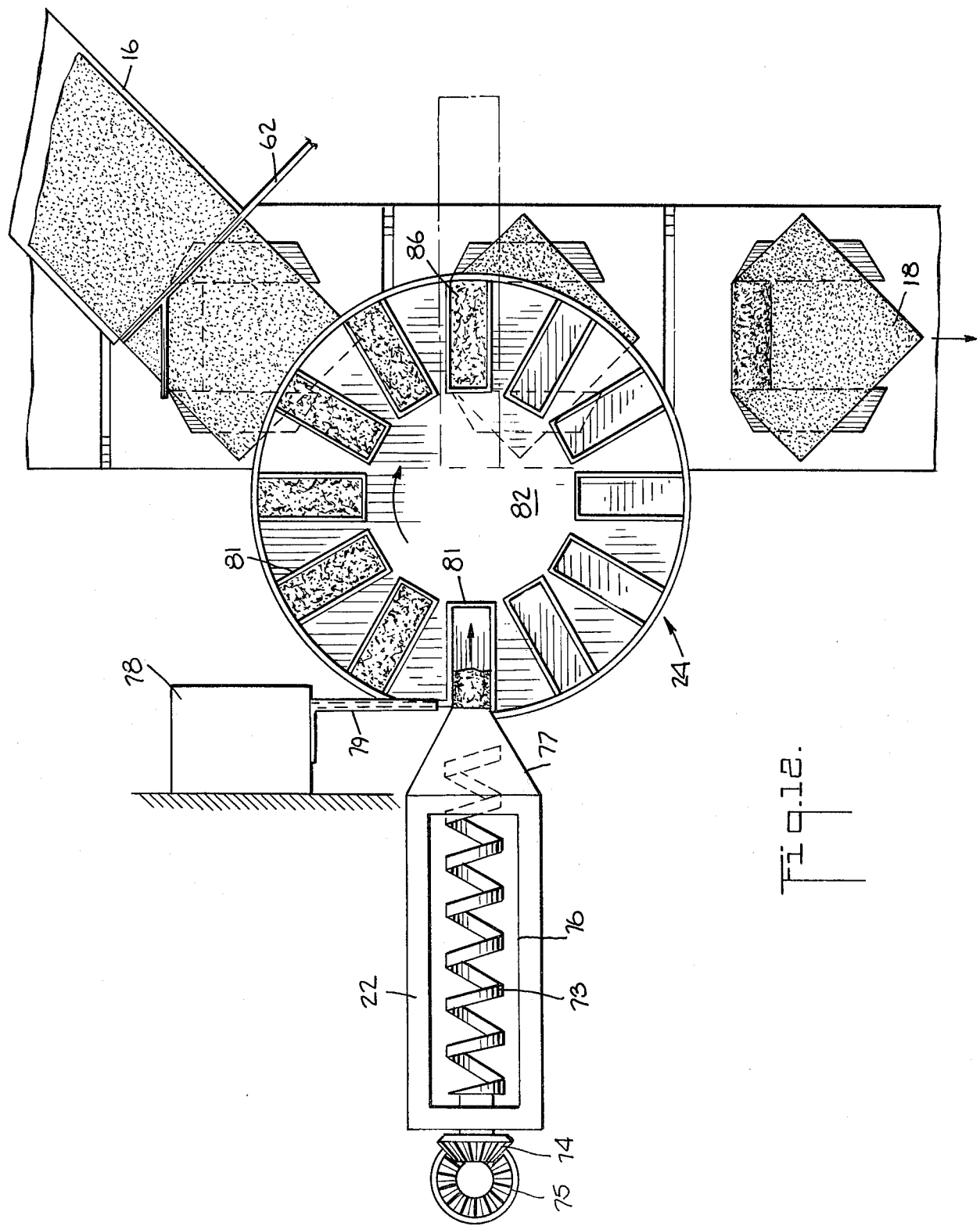

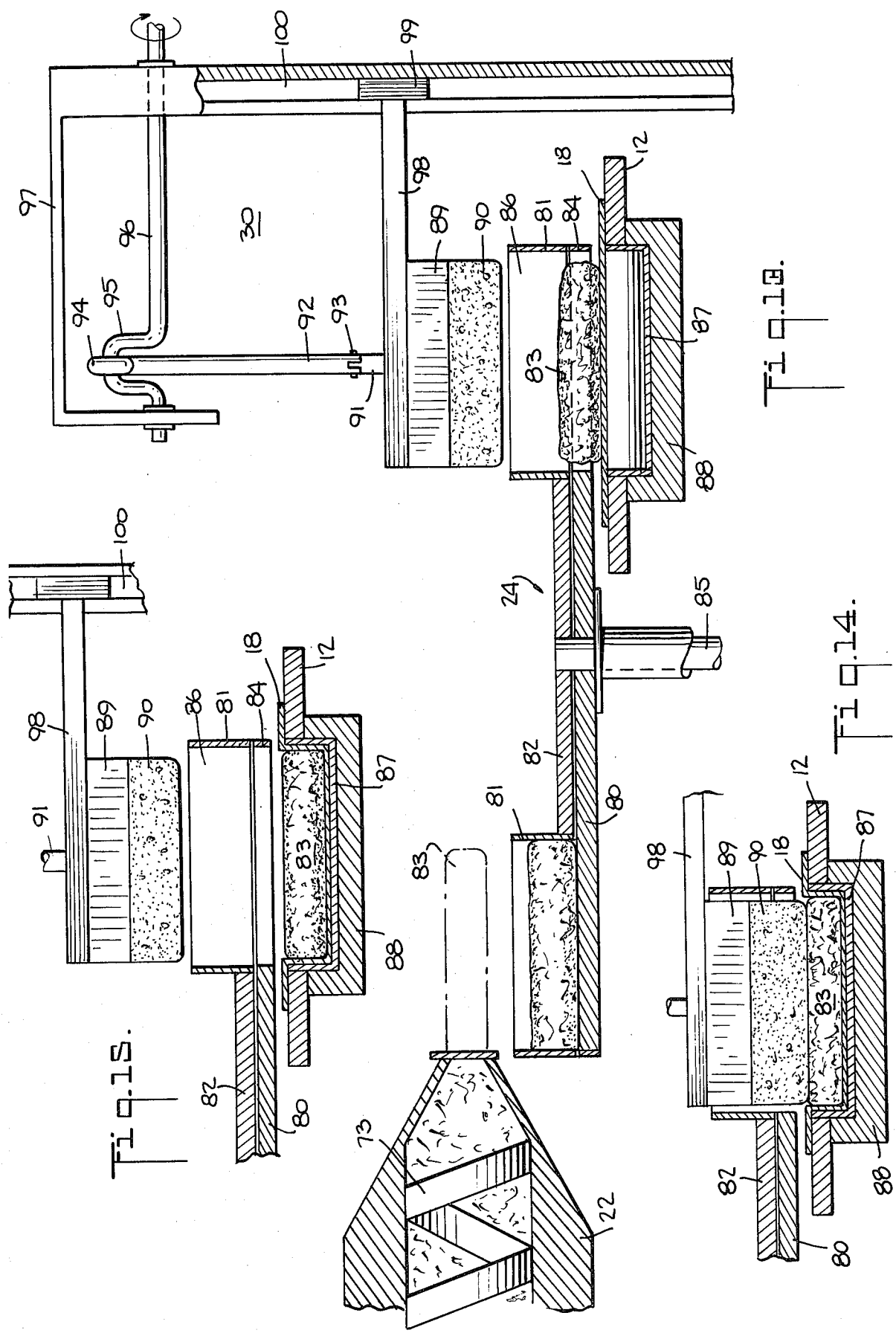

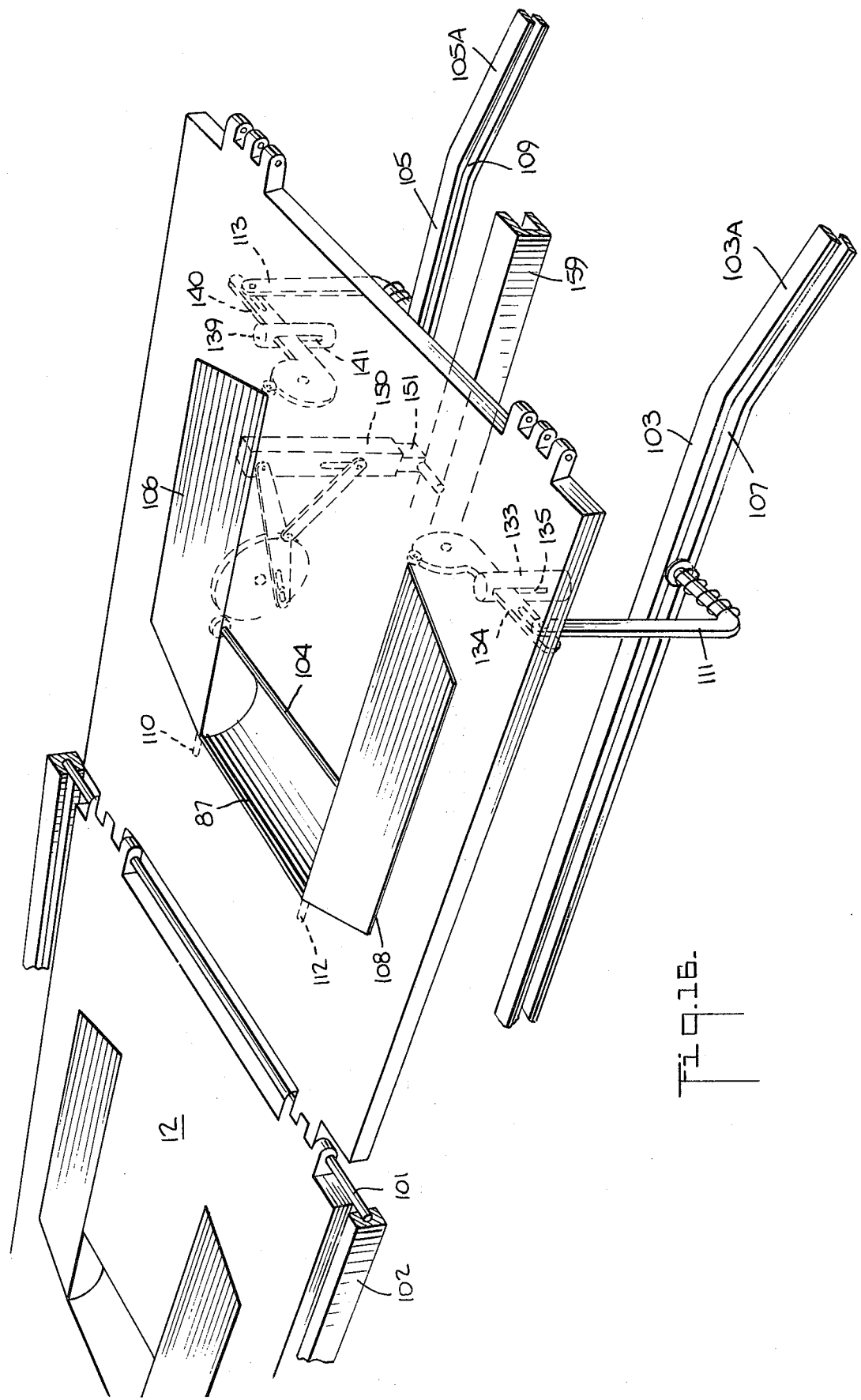

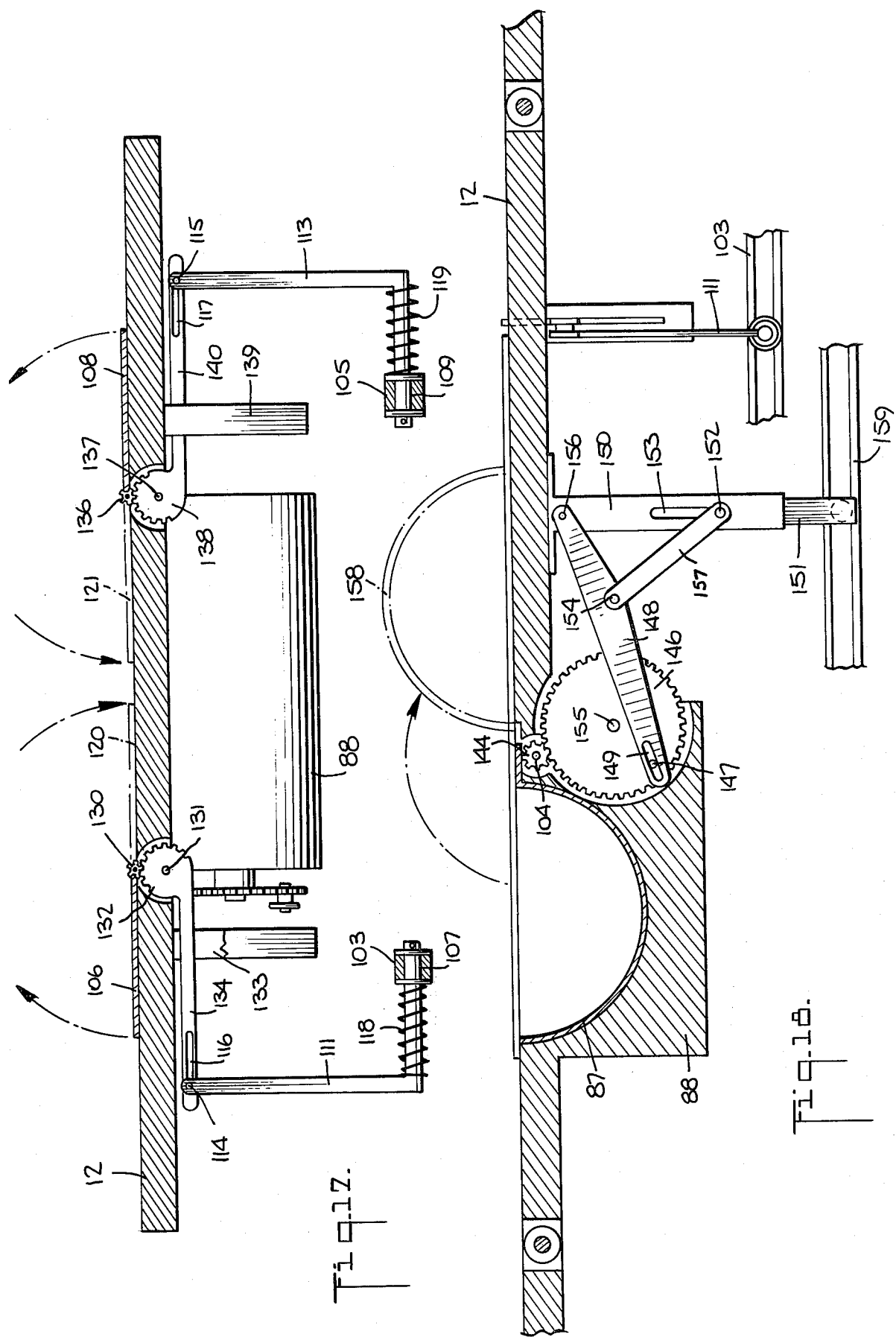

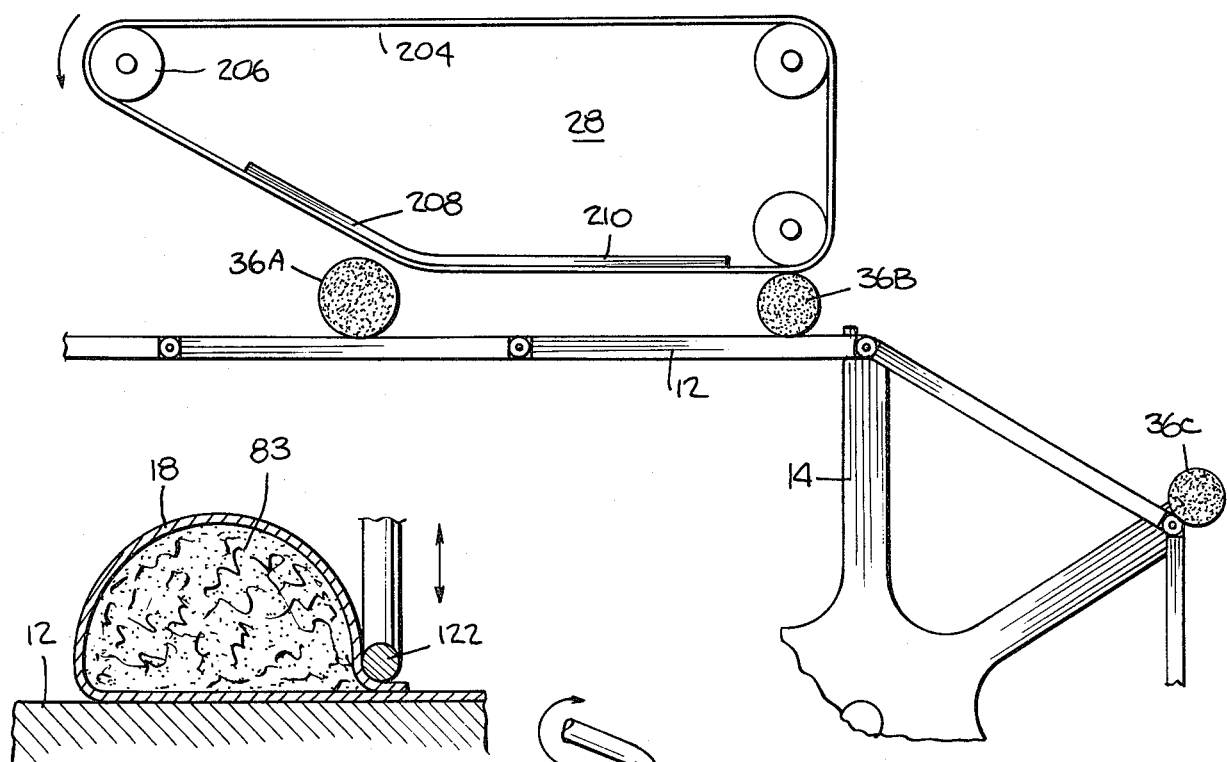
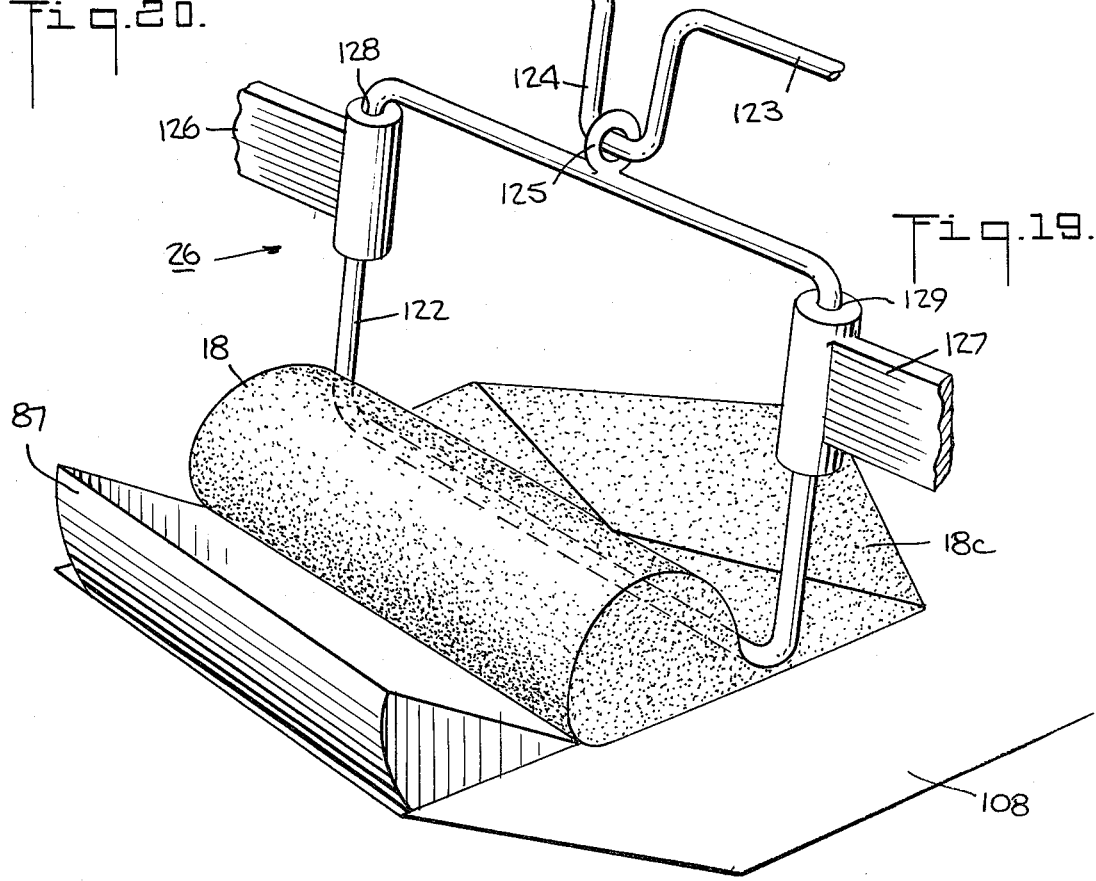

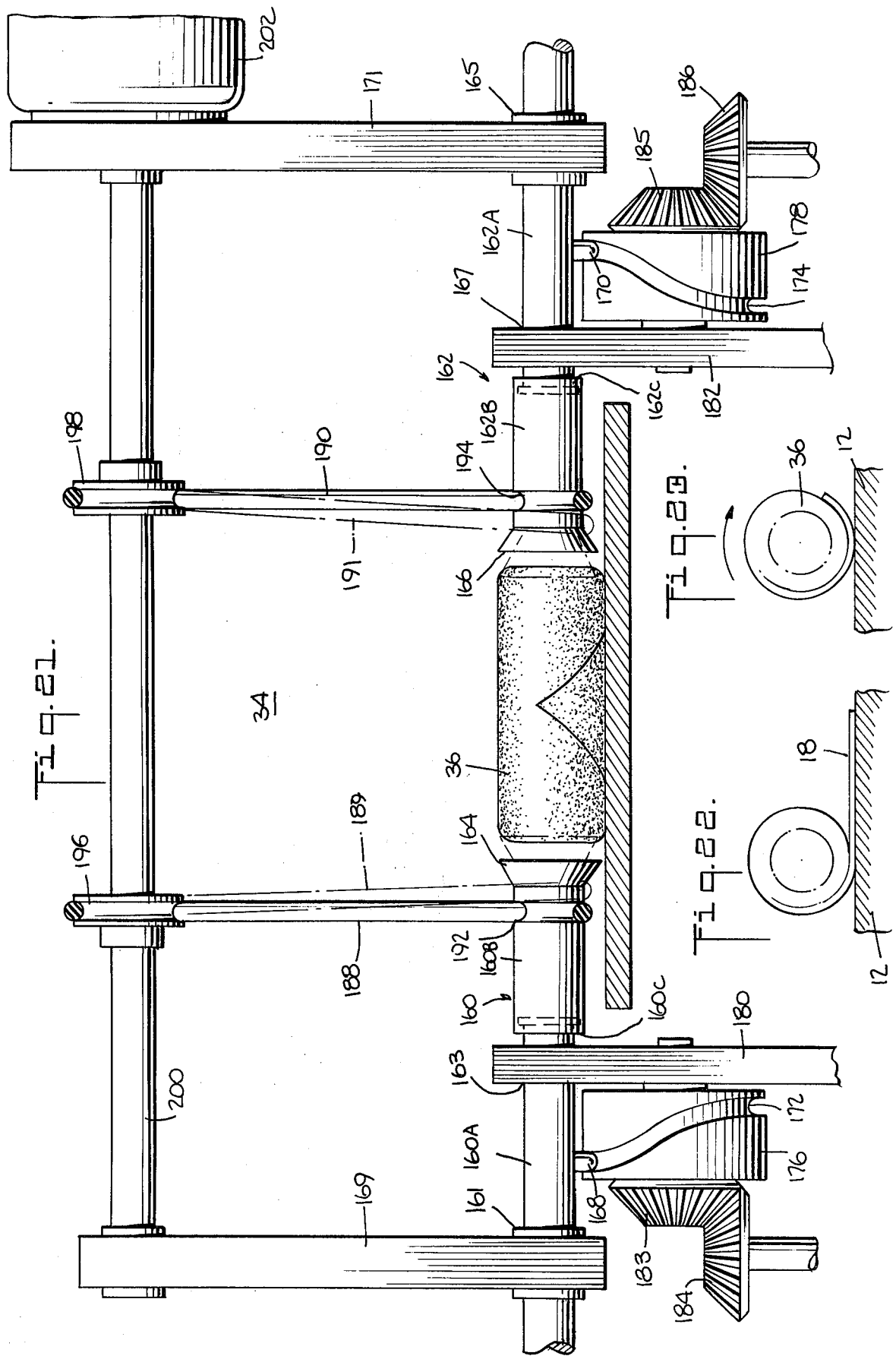

AUTOMATIC EGG ROLL MAKING MACHINE

BACKGROUND OF THE INVENTION

1. Field of the Invention

The present invention relates to egg roll machines, and more particularly to the automatic handling of the food ingredients and the formation of the egg roll skin around such food ingredients to provide the final product.

2. Description of the Prior Art

In the past, attempts have been made to automatically make egg rolls by apparatus which provides the operations traditionally performed by hand. These operations include the placing of the food stuffing on the egg roll skin, folding the two opposite sides of the egg roll skin over the stuffing, and rolling the egg roll skin and its food stuffing over an unfolded portion of the egg roll skin having a bonding agent thereon to form the completed product. The apparatus known to date have the associated problems involving the loose packing of the food stuffing after it is placed on the egg roll skin, since the ingredients are generally of a light weight and contain individual particles which are not adhered to each other. The known apparatus for wrapping the egg roll skin and for handling the food ingredients result in a loosely packed egg roll. Another problem associated with known apparatus is that it involves complex apparatus which in some cases has not been able to form the egg roll into the cylindrical shape traditionally characteristic of the egg roll. Also, the apparatus used for forming the egg roll often results in tearing of the egg roll skin during the folding or rolling operation.

SUMMARY OF THE INVENTION

It is an object of the present invention to provide an automatic egg roll making machine which contains food stuffing which is maintained in a compact form during the egg roll forming operation.

It is another object to provide an automatic egg roll making machine which does not tear the egg roll skin during the forming and rolling operations.

It is another object or provide an automatic egg roll forming machine which is simple and economical while producing a final product which is shaped like the traditional hand-made egg roll.

These and other objects are achieved by the present invention which provides a method and apparatus for automatically making egg rolls which includes a skin feeding device for feeding the egg roll dough skins in individually cut sections on to a conveyor. The conveyor includes a plurality of connected plates, each of which provides a semi-cylindrical mold cup that is activated to form the egg roll skin in the desired shape around the food stuffing contained therein. Each conveyor plate includes a mold cavity formed by the mold cup with its opening at the top surface of the conveyor plate. The egg roll skin is positioned on each conveyor plate so that it covers the mold cup opening in each conveyor plate. Each section of egg roll skin moves on a conveyor plate to a position beneath a rotary turntable. The rotary turntable receives the food stuffing material from a food injector which deposits a portion of food stuffing on to the egg roll skin as it passes beneath the rotary turntable. A food stuffing compactor is located above the rotary turntable and operates a ram block which compacts the food stuffing against the egg roll skin so that it fills the mold cup. A pair of side folding plates are pivotally mounted on each conveyor plate and spaced apart with the mold cup located therebetween. After the food stuffing is pressed into the mold cavity, the two side folding plates are activated to fold the two opposite corners of the egg roll skin over towards the center of the skin. Once the side folding plates have been retracted away from the egg roll, the mold cup is activated from its position below the conveyor plate so that it pivots on to the top of the conveyor plate. The mold cup is retracted below the conveyor plate, leaving the egg roll in a partially formed condition whereby the food stuffing and its surrounding egg roll skin are folded over on top of the conveyor plate. The conveyor moves the semi-formed egg roll to a spraying station where a spray device directs a bonding agent, such as egg yolk or glucose, on to an exposed portion of the egg roll skin. The final rolling operation of the egg roll is performed by a rolling device which contacts and rolls the egg roll until the skin forms a cylindrical shape around the compact food stuffing.

BRIEF DESCRIPTION OF THE DRAWINGS

FIGS. 2 through 10 show a sequence of views illustrating the egg roll forming operation at a conveyor plate;

FIG. 12 is a top view of the food injector and rotary turntable for feeding portions of food stuffing on to each conveyor plate;

FIGS. 13, 14 and 15 show detailed side views of the rotary turntable and the food stuffing compactor in the positions prior to, during and after the food stuffing is pressed in the mold cup;

FIG. 16 shows a perspective view of a conveyor plate and folding assembly;

FIG. 17 shows a detailed cut-away view of the mechanism for activating the pair of side folding plates;

FIG. 18 shows a detailed cut-away view of the mechanism for activating the mold cup;

FIGS. 19 and 20 show perspective and side views, respectively, of a hold down device for the egg roll skin and food stuffing;

FIG. 21 is a detailed view of the rolling device for rolling the egg roll into its final cylindrical form;

FIGS. 22 and 23 illustrate the rolling operation performed on the egg roll by the device of FIG. 21; and FIG. 24 shows a roll off device.

DESCRIPTION OF THE PREFERRED EMBODIMENTS

Figure 1:
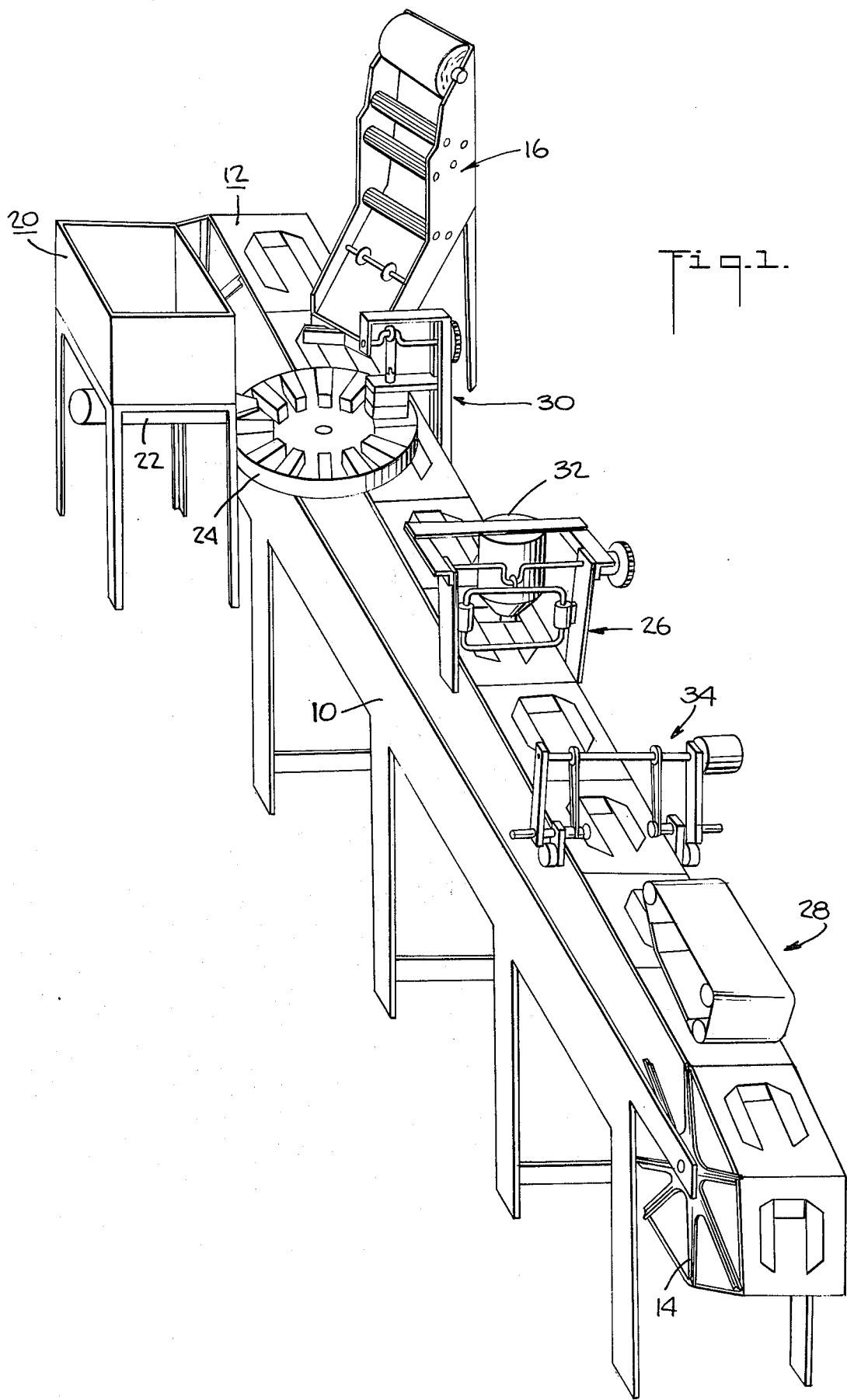
FIG. 1 is an overall view of the egg roll making machine made in accordance with the present invention.

Referring to FIG. 1 there is shown an overall view of the egg roll making machine which includes a conveyor 10 having a plurality of conveyor plates 12 which are hinged together to form a conveyor belt. Egg roll skin is fed on to the conveyor plates by a dough feeding device 16 which supplies an individually cut section of the egg roll skin on to each conveyor plate 12. A food container 20 is provided for storing the particular food stuffing material. At the bottom of the food container 20 is a food injector 22 for feeding individual batches of the food stuffing on to a rotary turntable 24. The rotary turntable 24 is located above the conveyor plates 12 and includes an exit opening located vertically above the central portion of the conveyor plates 12. The rotary turntable 24 is indexed by gear means, to be described in detail hereinafter, so that the food stuffing is dropped from the rotary turntable 24 through an exit opening at the precise time when each conveyor plate 12 is approximately centrally located beneath the exit opening.

As will be shown and described in connection with subsequent Figures, the egg roll skin is positioned on each conveyor plate 12 so that it covers a mold cup opening in each conveyor plate. A food stuffing compactor 30 is located above the rotary turntable 24 and operates a ram block which compacts the food stuffing against the egg roll skin so that it fills the mold cup. Two side folding plates, and then the mold cup, are sequentially activated to fold a portion of the egg roll skin about the food stuffing, as will be described in detail hereinafter. A spray device 32 containing a bonding agent, such as egg yolk or glucose, applies a layer of the bonding agent on the unfolded portion of the egg roll skin. A rolling device 34 rolls the egg roll into its final cylindrical shape after which it is removed from the conveyor 10. Also shown in FIG. 1 are a hold down device 26 for holding the folded portion of egg roll in place after the mold cup is activated, and a roll off device 28 for rolling the egg roll along the surface of the conveyor plate 12.

Referring to FIGS. 2 through 10, there is shown a sequence of views illustrating the egg roll forming operation at a conveyor plate 12. Specifically, in FIG. 2, there is shown the step of feeding an individual egg roll skin 18 onto the top surface of the conveyor plate 12. In the next step shown in FIG. 3, the rotary turntable 24 has deposited a portion of food stuffing 83 on top of the egg roll skin 18 at the location where the skin 18 overlies a mold cavity formed by a semi-cylindrical mold cup, shown in dotted line in FIG. 2. FIG. 4 shows the compacting step wherein the food stuffing is pressed down into the mold cavity by means of the food stuffing compactor 30. Compactor 30 has a ram block 89 which operates to compact the food stuffing when moved in the direction shown by the arrow. After the ram block 89 is retracted, the food stuffing 83 is contained in the mold cavity, as shown in FIG. 5. Here, it can be seen that the egg roll skin 18 is positioned with two opposite side corners 18A and 18B lying on top of respective ones of two side folding plates 108 and 106. As shown in FIGS. 6 and 7, the two side folding plates 106 and 108, which essentially have a flat surface, are activated to rotate about their respective hinges so that the plates overlap on top of the mold cavity. The side folding plates 106 and 108 are then retracted away from the position shown in FIG. 6 to their initial position shown in FIG. 7, thereby leaving the egg roll exposed with the two side corners 18A and 18B folded over-to-center in the position shown. Next, the mold cup is activated from its position below the conveyor plate 12 so that it pivots out to the position shown in FIG. 8 whereby the food stuffing is transferred by the mold cup 87 on to the top of the conveyor plate 12. At this point, the egg roll has been further formed by the action of the mold cup 87, since the stuffing is now rolled, to some extent, in the egg roll skin. The spray device 32 sprays a bonding agent on the exposed area of egg roll skin in the area of of the corner 18C. Next, as shown in FIG. 9 the egg roll is rolled into its final cylindrical shape by means of two roller arms 160 and 162 of the rolling device 34. The fully formed egg roll is indicated by the numeral 36 in FIG. 10.

Figure 11:
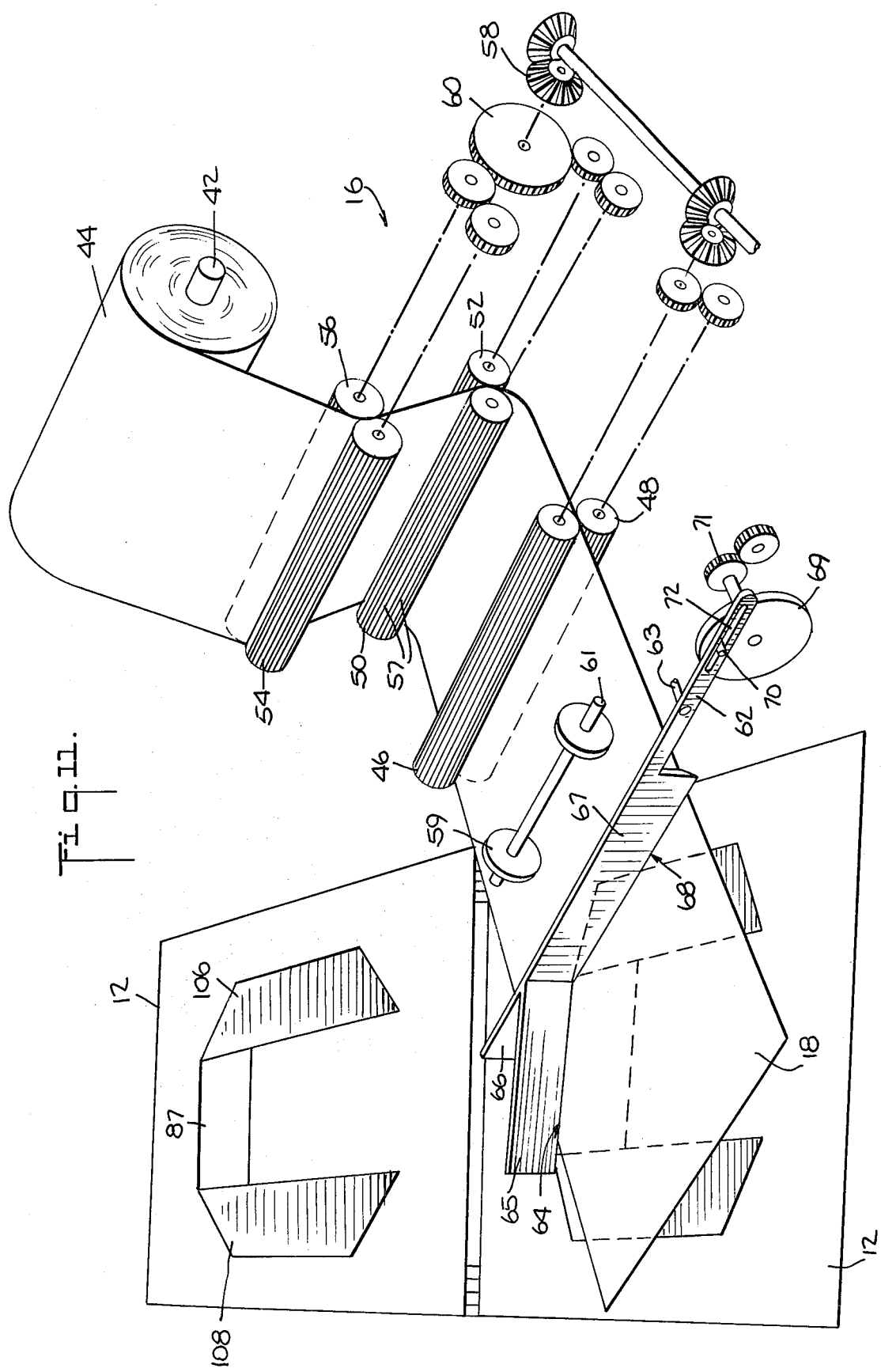
FIG. 11 is a detailed drawing of the egg roll skin feeding device including the cutting device for providing individually cut egg roll skin sections.

Referring to FIG. 11, there is shown a detailed view of the dough feeding device 16 shown in FIG. 1. Device 16 includes a frame structure which is adapted for supporting a roll of dough 44 on a supporting bar 42. The dough from the roll 44 is shaped through three pairs of closely spaced rollers 46, 48, and 50, 52 and 54, 56, respectively. The rollers of each pair are closely spaced for pressing the roll of dough therebetween. The rollers have a series of longitudinal cuts 57 formed along the roller surface to enhance the gripping action of the rollers on the dough skin. Also, the rollers are connected via gears 58 and 60 to a drive shaft. The gear 60 is operatively connected to the central motive means for the conveyor 10. It is to be understood that while the gears 60 and the bevel gears 58 are shown in FIG. 11 for driving the dough feeding rollers, other forms of conventional drive means may be suitably employed. At the bottom of the dough feeding device 16 there is located a pair of roller discs 59 connected for rotation about a rod 61. The discs 59 serve to position the dough skin 18 along the bottom of the dough feeding device 16 as the skin 18 is moved toward a position on top of the conveyor plate 12.

Located adjacent the dough feeding device 16 is a knife device for cutting the egg roll skin 18 as a section of such skin is placed on top of the conveyor plate 12. The knife device includes a blade arm 62 which is pivoted about a fixed pivot shaft 63. The blade arm 62 includes a transverse cutting portion 67 and a diagonal cutting portion 65 for respectively cutting the skin 18 along the lines 68 and 64. this occurs when the blade is moved into its lowermost position by the cam arrangement 69, 70 and 72. The cam arrangement includes a cam member 69 which is rotated by gear 71 connected to the central motive means for the conveyor 10. Fixedly attached to the cam member 60 is a follower pin 70 which rides in a longitudinal guide slot 72 formed in the blade arm 62. As the roll of dough is advanced past the rollers of the dough feeding device 16, it is cut by the knife device as the blade arm 62 is picoted on the shaft 63 by means of the eccentric action of the cam member 69 and the follower pin 70 in the guide slot 72. As shown in FIG. 11, the dough feeding device 16 is positioned to feed the cut sections of egg roll skins 18 at a diagonal relationship on top of the individual ones of conveyor plates 12, with the opposite side corners of the skin lying across the side folding plates 106 and 108.

As shown in FIG. 11, the individual egg roll skin 18 is generally square shaped. The preferable shape of the egg roll skin 18 involves the further cutting of the skin 18 along the line 64 so that a corner is cut off. This corner is cut off by the blade portion 65, and the cut-away corner is removed from the roll of skin by the blade portion 66. In this fashion, the resultant portion of skin 18 which is cut out does not include the cut-away corner. Removal of this corner of the skin 18 has been found to facilitate the folding and rolling operation, as will be described in detail hereinafter.

Referring to FIG. 12, there is shown a top overall view of the food injector 22 and rotary turntable 24. The food injector 22 includes a rotating screw feed 73 which is attached to a rotating shaft driven by bevel gears 74 and 75. As the food stuffing is received through an opening 76, the screw feed 73 forces the food stuffing into a conical outlet 77 leading on to the rotary turntable 24. A knife means 78 activates a blade 79 for separating the appropriate sized portions of food stuffing. The rotary turntable 24 includes a plurality of spaced-apart, food stuffing containers 81 for holding the food stuffing until it is deposited through an opening 86 located above the conveyor plate 12.

Referring to FIGS. 13, 14 and 15, there are shown detailed views of the rotary turntable 24 and the food stuffing compactor 30. The rotary turntable 24 includes a fixed bottom plate 80 and a rotatable top plate 82. The top plate 82 includes a plurality, such as 12, of the ccontainers 81 spaced apart at equal distances from each other along the periphery of the top plate 82. Each container 81 has an enclosed wall, but is open at the top and bottom. The fixed bottom plate 80 includes one slot or cut out portion 84 located at a position directly above the conveyor plate 12 as they pass beneath the rotary turntable 24. As shown in FIG. 13, a portion of food stuffing 83 is deposited by the food injector 22 into a container 81. The top plate 82 is rotated by a shaft 85 driven by a means such as an indexing gear, not shown. When one of the containers 81 of the top plate 82 is in alignment with the slot 84 of the bottom plate 80, there is formed the exit opening 86 through which the food stuffing 83 drops on to the egg roll skin 18 resting on top of a conveyor plate 12. As indicated above, a portion of skin 18 covers the opening formed by the mold cup 87 which forms a recess or cavity in the conveyor plate 12. The mold cup 87 rests against a mold support block 88 which is secured to the assembly of the conveyor plate 12. The mold support block 88 has a semi-cylindrical shape which coincides with the shape of the mold cup 87.

Referring again to FIGS. 13, 14 and 15, the food stuffing compactor 30 includes an upper ram block 89 and a lower ram block 90 which are driven by an extensible ram arm 91, 92. The lower ram block 90 is made of a soft material, such as a sponge or a cloth, which presses the food stuffing 83 through the exit opening 86, against the egg roll skin 18, and into the mold cup 87. The upper ram block 89 may form a part of the lower ram block 90 or be a separate supporting portion attached to such block 90. The ram arm portion 91 is pivotally connected by a pin 93 to the ram arm portion 92. Ram arm portion 92 has a bearing or eye 94 at its upper end for receiving a U-shaped portion 95 of a rotatable shaft 96. Shaft 96 is driven by means, such as gears, not shown. Also, the shaft 96 is mounted by a support member 97 for rotating motion thereon. Included on the support member 97 is a longitudinal guide slot 100 for receiving a guide block 99 which moves in a vertical motion in the slot 100 as the shaft 96 rotates. The guide block 99 is connected to the ram arm and ram block assembly by means of a guide arm 98.

In operation, the ram block 90 is essentially moved in a generally vertical direction by means of the rotating shaft 96 and its U-shaped extension 95 and bearing 94. As the shaft 96 rotates, the guide block 99 serves to maintain the ram block 90 in a vertical, up and down movement. FIG. 13 shows the position of the ram block 90 at its uppermost point directly above the opening 86 when the container 81 and the slot 84 are in registration. FIG. 14 shows the ram block 90 in its lowermost or compacting position wherein the food stuffing 83 has been pressed against the egg roll skin 18 and pushed down into the mold cavity. FIG. 15 shows the position of the ram block 90 after it is returned to its uppermost position, out of the opening 86.

It is noted that the use of a soft material for the lower ram block 90, such as a sponge or a cloth wrapping, assures a gentle handling of the food stuffing 83 and the egg roll skin 18. It is also noted that the drive means for the shaft 96 is timed with the operation of the rotary turntable 24 and the conveyor 10 so that the arm 92 and the ram block 90 is extended only at the time when the upper plate 82 and the lower plate 80 are in alignment to form the exit opening 86. This alignment occurs at the same time when the conveyor plate 12 is positioned with the mold cup 87 directly below the exit opening 86. Of course, it should be understood that the means for indexing and timing the rotary timetable 24, the food injector 22 and the food stuffing compactor 30 with the conveyor 10 comprise conventional driving devices, and, therefore, are not shown herein.

Referring to FIG. 16 there is shown a perspective view of a conveyor plate 12 with its folding assembly which includes the two side folding plates 106 and 108 and the mold cup 87. Each conveyor plate 12 is interconnected with an adjacent plate 12 by means of a linkage rod 101 extending through the mating hinges. The ends of the linkage rod 101 ride in track formed in a pair of guide rails 102. The side folding plates 106 and 108 are respectively connected for pivotal movement by means of hinge rods 110 and 112. Also, the semi-cylindrical mold cup 87 is connected for pivotal movement by means of a hinge rod 104. The mechanisms for activating the folding plates 106 and 108, and the mold cup 87 are shown in FIGS. 17 and 18 in greater detail and, therefore, will hereinafter be described in connection with FIGS. 16, 17 and 18.

Referring to FIG. 17, there is shown a cross-sectional view of the mechanism for activating the side folding plates 106 and 108. Here, the side folding plate 106 is connected with its hinge 110 operatively connected to a gear 130. Gear 130 is driven by a further gear means 132 formed with a gear arm 134. Similarly, the side folding plate 108 has its hinge 112 connected to a gear 136 which in turn is connected through a gear means 138 formed with a gear arm 140. The gear means 132 and 138 are respectively pivoted about pivot pins 131 and 137 by linkage means operatively connected to the ends of the gear arms 134 and 140, respectively. This is accomplished by means of drive arms 111 and 113 which are respectively connected to the gear arms 134 and 140, by pins 114 and 115 which ride in elongated slots 116 and 117 formed in such gear arms 134 and 140. Each of the drive arms 111 and 113 moves in a generally up and down vertical motion which is produced by respective guide rails 103 and 105, shown moore specifically in FIG. 16. Guide rails 103 and 105 have respective tracks 107 and 109 along which the ends of the drive arms 111 and 113 ride. The guide rails 103 and 105 are curved along sections 103A and 105A, respectively, in a manner which causes the drive arms 111 and 113 to be lowered and pivot the gear arms 134 and 140 about the pivot pins 131 and 137. The slots 116 and 117 serve to accommodate the pins 114 and 115 as the drive arms 111 and 113 are moved. Also, spring biasing means 118 and 119 are respectively interposed between the drive arms 111 and 113 and the guide rails 103 and 105 in order to urge the arms 111 and 113 in a lateral outward direction. As the gear arms 134 and 140 are pivoted, their movement is controlled by means of arm guides 133 and 139 providing vertical slots 135 and 141 in the respective guides, as shown in FIG. 16. Arm 134 of gear arm 132 is controlled in its up and down movement within the slot 135. Similarly, arm 140 is controlled in its movement within the elongated slot 141. The length of each slot 135 and 141 is fixed so that the gear arms 134 and 140 can be pivoted in an arc which causes the side folding plates 106 and 108 to move in the 180° arc, shown in FIG. 17, towards the central folding position indicated by numerals 120 and 121.

Referring again to FIG. 18, there is shown a cross-sectional view of the mechanism for actuating the mold cup 87. A gear 144 is connected to the hinge 104, shown in FIG. 16, for rotating the mold cup 87. Gear 144 is operatively connected to a further gear 146 which is operated by a linkage assembly. This linkage assembly commprises a pin 147 which is attached to the gear 146 and is contained within an elongated slot 149 in a link arm 148. Link arm 148 is pivotally connected by a pin 156 to a fixed arm 150 connected to the structural frame of the conveyor plate assembly. pivotal movement of the link 148 is produced by a gear drive arm 151 which is raised and lowered to move a slot pin 152 within a vertical guide slot 153 in the fixed arm 150. Pin 152 is also attached to one end of a link arm 157 having its other end pivotally connected by a pin 154 to the link arm 148. The gear 146 is turned about a fixed pivot axle 155 which is fixed in position with respect to the conveyor plate. Also, the pin 147 is fixedly attached to the gear 146 so that movement of the pin 147 in turn will rotate the gear 146 about its pivot axis 155. In operation, when the gear drive arm 151 is moved upward, pin 152 moves towards the top of the guide slot 153 and in turn causes the link arm 157 to pivot the link arm 148 in a clockwise direction about its pivot pin 156. Such movement in turn causes the pin 147 and gear 146 to move clockwise. The clockwise movement of gear 146 causes gear 144 to move counterclockwise and retract the mold cup 87 away from its folding position, shown by dotted line 158, and back to its retracted position in the mold support block 88. Similarly, a downward movement of the gear drive arm 151 causes the link 148 to pivot in a counterclockwise position about the pin 156, thereby rotating the gear 146 in a counterclockwise direction. This movement causes the gear 144 to rotate in a clockwise direction and thereby rotate the mold plate 102 from its retracted position into its folded position shown by the dotted line 158. The vertical movement of the gear drive arm 151 is caused by a guide rail 159 having a track which is curved to cause the appropriate motion of such arm 151. It is noted that each conveyor plate assembly comprises the gear and linkage assemblies shown in FIGS. 16, 17 and 18. It is also to be pointed out that the side folding plates and the mold cup 87 are activated in each conveyor plate 12 when the plate 12 is positioned at one or more points located between the stations for the food stuffing compactor 30 and the spray device 32.

Referring to FIGS. 19 and 20, there are shown a perspective and a side view of the hold down device 26 which operates to hold the folded skin 18 wrapped around the food stuffing at the same time that the mold cup 87 is being retracted from its folding position back into the recess in the conveyor plate 12. Specifically, there is included a hold down bar 122 which is a rectangular shaped ring having an eye-type of bearing or loop 125 formed at its upper portion for rotatably connecting with a U-shaped portion 124 of a rotating shaft 123. Shaft 123 is in turn operated by a gear means, not shown. The two upright sides of the hold down bar 122 extend through a pair of tubular bearing guides 128 and 129 which in turn are attached to the ends of support members 126 and 127, respectively. The support members 126 and 127 are mounted on the main frame of the conveyor 10 and are not attached to the moving conveyor plates 12. The bearing guides 128 and 129 may be formed of a flexible material, such as nylon. The bearing guides 128 and 129 act to guide the hold down bar 122 in a generally vertical movement such that the lower side of the bar 122 is brought to rest against the egg roll skin 18, as shown. This occurs after the mold cup 87 has folded the food stuffing 83 and its surrounding egg roll skin 18 onto the top of the conveyor plate 12. As the mold cup 87 is retracted to its position below the conveyor plate surface, the hold down bar 122 serves to prevent any tendency of the skin 18 and stuffing 83 to return with the retracting mold cup 87.

Referring to FIG. 21 there is shown a detailed drawing of the rolling device 34 for rolling the egg roll from its partially formed condition, shown in FIGS. 8, 19 and 20, into its final egg roll form which is shown by the numeral 36 in FIGS. 10 and 23. Generally, the rolling operation is produced by two identical roller arms 160 and 162 located on the opposite ends of the partially rolled egg roll. Roller arms 160 and 162 each rotate in the same direction and are moved inwards until they contact the egg roll whereupon their rotating motion causes the exposed egg roll skin, shown as portion 18C in FIG. 8, to be rolled into the body of the egg roll. More specifically, the roller arm 160 includes a front portion 160B and rear portion 160A having a smaller diameter than such front portion. A shoulder 160C is formed at the point where the front portion 160B meets with the rear portion 160A. The rear portion 160A of the roller arm 160 is adapted for a transverse longitudinal movement within a coupling 163 in a cam support 180 and within a coupling 161 in a support arm 169. However, the front portion 160B is adapted for both rotary and transverse longitudinal motion. This movement is provided by longitudinal, but not rotary, bearing couplings 161 and 163. Front portion 160B and rear portion 160A are locked together for joint longitudinal motion, but have a rotary bearing, shown in dotted line, between them to permit relative rotation therebetween. Attached to the rear arm portion 160A is a cam follower 168 which travels within a cam guide 172 formed in a cam 176. Cam 176 is attached for rotary movement on the cam support 180 as well as being operatively connected to gear means comprising two bevel gears 183 and 184. Rotation of the cam 176 causes the cam follower 168 to move in a horizontal direction thereby moving both portions 160A and 160B of the roller arm 160 between the position shown and the dotted line position wherein an end cup 164 of the roller arm 160 is in contact with the side of the egg roll 36. Similarly, the roller arm 162 includes a front end portion 162B, a rear portion 162A and a shoulder 162C. Attached to the roller arm is a cam follower 170 and an end cup 166 having a circular shape for engaging with the end of the egg roll 36. The end cups 164 and 166 comprise a soft grasping material, such as a cloth or rubber. Cam follower 170 rides within a cam guide 174 formed in a cam 178. Cam 178 is attached for rotary movement to a cam support 182. Bevel gears 185 and 186 cause rotation of the cam 178 and thereby move the roller arm 162 in a longitudinal or transverse direction between the first position where its end cup 166 contacts the end of the egg roll 36 and a second position wherein the shoulder 162C abuts with the cam support 182. The relatively smaller arm portion 162A of the roller arm 162 is adapted for longitudinal movement within the longitudinal bearing coupling 165 formed in a structural support arm 171 and a similar longitudinal bearing coupling 167 formed in the cam support 182. The front roller arm portion 162B is adapted for both rotary and longitudinal motion by means of the rotary bearing, shown in dotted line, between the portions 162A and 162B.

Belts 188 and 190 are respectively attached to cylindrical recesses 192 and 194 formed in the roller arm portions 160B and 162B respectively. The other end of belts 188 and 190 are turned around on pulleys 196 and 198, respectively, which are rotated on a shaft 200. The belts 188 and 190 can be shifted to the dotted line positions indicated by numerals 189 and 191. Shaft 200 is connected at one end to the support arm 169 and at the other end is driven by a motor 202 which is continuously operated during the operation of the egg roll forming machine. In operation, the rotation of cams 176 and 178 cause the roller arm portions 160A and 162A to be driven longitudinally and thereby also cause the roller arm portions 160B and 162B to move with the end cups 164 and 166 towards the egg roll 36. As described above, the front arm portions 160B and 162B are rotated by the belts 188 and 190. When the end cups 164 and 166 contact the egg roll 36, it is rolled until its exposed skin portion, having the bonding agent thereon, is rolled on to the main body and a cylindrical shape is achieved. This is shown in the FIGS. 22 and 23. At that time, the gear means 184 and 186 are activated to retract the roller arms 160 and 162 away from the egg roll 36.

Referring to FIG. 24, there is shown the roll off device 28 which can be used with the above described apparatus. The roll off device 28 comprises a rotating belt 204 which is driven by a pulley 206. The continuous loop belt 204 is turned around a guide means consisting of a tapering portion 208 and a generally straight portion 210. The guide means 208 and 210 are spaced a vertical distance above the top surface of the conveyor plates 12 so that an egg roll 36A will make contact with the belt 204 as it enters the area near the guide portion 208. At this point, the egg roll 36A will be rolled as it contacts the belt 204 in the area under the guide portion 210. The egg roll at the end of the guide portion 210 is shown by the numeral 36B. At this point, the egg roll 36B is near the conveyor turning wheel 14 and rolls off the conveor, as shown by numeral 36C, as the final product.

Although the above description is directed to the preferred embodiments of the invention, it is noted that other variations and modifications will be apparent to those skilled in the art, and, therefore, may be made without departing from the spirit and scope of the present invention.

What is claimed is:

1. Apparatus for automatically making egg rolls, comprising:

a folding assembly;
means for feeding an egg roll skin on to the top surface of the folding assembly;
a mold means included in said folding assembly and having a mold cavity with an opening facing a top folding surface upon which an egg roll skin rests, said mold means being adapted for receiving a portion of said egg roll skin and a food stuffing through said opening to substantially fill said mold cavity;
means included in said folding assembly for folding the two opposite sides of said egg roll skin over to the central portion of said egg roll skin adjacent said mold cavity;
means for activating said mold means from a first position to a second position whereby a portion of said egg roll skin lining the walls of said mold cavity and the food stuffing therein is folded over on to a remaining portion of said egg roll skin, thereby partially forming said egg roll;
means for applying a bonding agent to a portion of said egg roll skin; and
means for wrapping and the remaining unfolded portion of saidd egg roll skin to form a final egg roll product.

2. Apparatus as recited in claim 1, wherein said folding means comprise a pair of plates which are spaced apart and pivotally mounted for movement from an open position whereby said plates extend beneath two opposite sides of said egg roll skin to a closed position whereby said plates fold said opposite sides over towards the central portion of said egg roll skin.

3. Apparatus as recited in claim 1, wherein said mold means comprises a semi-cylindrical mold forming a cavity which is open in the longitudinal plane at the top folding surface.

4. Apparatus as recited in claim 1, further comprising means for positioning said egg roll skin so that a portion covers the opening of said mold cavity, and compacting means for pressing said food stuffing against said egg roll skin and into said mold cavity whereby said food stuffing substantially fills said cavity.

5. Apparatus as recited in claim 2, wherein said pair of plates, when in said open position, lie in the plane of said top folding surface, and said mold means, when in said first position, is recessed below said top folding surface with its mold opening lying in said plane of said top folding surface.

6. Apparatus as recited in claim 5, wherein the activating means for said side folding plates includes pivot means for pivoting each folding plate over an arc of 180° above said top folding surface, and said moving means for said mold means includes a pivot means for pivoting said mold means over an arc of 180° between said first and second positions.

7. Apparatus as recited in claim 1, further comprising compacting means for pressing said food stuffing against said egg roll skin and into said mold cavity, thereby substantially filling said mold cavity.

8. Apparatus as recited in claim 1, further comprising means for holding said egg roll skin and said food stuffing in its folded over position produced when said mold means is activated to said second position, whereby said mold means is activated and returned to said first position without said egg roll skin and said food stuffing contained therein.

9. Apparatus as recited in claim 1, wherein said holding means includes a hold down bar which is activated to a lowered position against the egg roll skin portion which has been folded over by said mold means, said hold down bar being returned to a raised position after said mold means is returned to its first position.

10. Apparatus for automatically making egg rolls, comprising:

a folding assembly;

means for feeding an egg roll skin on to the top surface of the folding assembly;

a pair of side folding plate means included in said folding assembly, said side folding plate means being spaced apart and adapted for folding the two opposite sides of said egg roll skin over to the central portion of said egg roll skin;

a mold means included in said folding assembly, said mold means being located between said pair of side folding plate means and providing a mold cavity having an opening facing the top surface of said folding assembly, said mold means being adapted for receiving a portion of said egg roll skin and a food stuffing within its opening to substantially fill said mold cavity;

means for activating said side folding plate means towards each other in a manner which folds the two opposite sides of said egg roll skin over toward the central portion of said egg roll skin;

means for moving said mold means from a first recessed position to a second position whereby a portion of said egg roll skin lining the walls of said mold means and the food stuffing in said mold means is folded over on to a remaining portion of said egg roll skin, thereby partially forming said egg roll;

means for applying a bonding agent to a portion of said egg roll skin; and means for wrapping the remaining unfolded portion of said egg roll skin to form a final egg roll product.

11. Apparatus as recited in claim 10, wherein said mold means comprises a generally semi-cylindrical mold forming a cavity which is open in a longitudinal plane along the top surface of the folding assembly.

12. Apparatus as recited in claim 10, further comprising pivot means for pivotally moving said mold means from said first position below the top surface of said folding assembly to said second position above said top surface.

13. Apparatus as recited in claim 10, further comprising compacting means for pressing said food stuffing against said egg roll skin and into said mold cavity whereby said food stuffing substantially fills said mold cavity with a portion of said egg roll skin lining the walls of said mold cavity.

14. Apparatus as recited in claim 13, wherein said compacting means includes a ram block made of a soft, spongelike material.

15. Apparatus as recited in claim 10, wherein said side folding plate means comprise a pair of plates which are spaced apart at the opposite ends of said mold means, each of said side folding plates having a working surface lying in a plane in the top surface of said folding assembly, said side folding plates being pivotally connected to fold the two opposite sides of said egg roll skin over towards the central portion of said egg roll skin and overlying the opening of said mold means.

16. Apparatus as recited in claim 10, wherein said means for activating said side folding plate means is operated before the operation of said means for moving said mold means.

17. Apparatus as recited in claim 10, wherein said means for wrapping the remaining unfolded portion of said egg roll skin to form a final egg roll product comprises a pair of roller arms mounted with their respective end faces on opposite ends of the partially formed egg roll, said roller arms being adapted for longitudinal movement from a first position out of contact with said egg roll to a second position whereby the end faces of said roller arms contacts the opposite portions of the egg roll, said roller arms also being adapted for rotating movement whereby the egg roll is caused to be rotated until the unfolded portion of the egg roll skin is wrapped around the body of the egg roll.

18. Apparatus as recited in claim 10, wherein said means for wrapping the remaining unfolded portion of said egg roll skin includes an endless rotating belt and belt guide means which are located above the top surface of said folding assembly with the belt guide means being gradually inclined downwards in the direction of the movement to a position where said belt makes contact with an egg roll and rolls it along said top surface.

19. Apparatus as recited in claim 11, further comprising means for positioning said egg roll skin so that a portion covers the opening of said mold cavity, and compacting means for pressing said food stuffing against said egg roll skin and into said mold cavity whereby said food stuffing substantially fills said cavity.

* * * * *